(12) United States Patent
Bae

(10) Patent No.: US 10,654,390 B2
(45) Date of Patent: May 19, 2020

(54) ASSEMBLED FOOTREST OF CAR SEAT APPARATUS FOR EARLY CHILD

(71) Applicant: Jong Hoon Bae, Daegu (KR)

(72) Inventor: Jong Hoon Bae, Daegu (KR)

( * ) Notice: Subject to any disclaimer, the term of this patent is extended or adjusted under 35 U.S.C. 154(b) by 53 days.

(21) Appl. No.: 15/771,916

(22) PCT Filed: Apr. 17, 2018

(86) PCT No.: PCT/KR2018/004431
§ 371 (c)(1),
(2) Date: Apr. 27, 2018

(87) PCT Pub. No.: WO2018/199532
PCT Pub. Date: Nov. 1, 2018

(65) Prior Publication Data
US 2019/0275920 A1    Sep. 12, 2019

(30) Foreign Application Priority Data

Jan. 16, 2018 (KR) .......................... 10-2018-0005438
Apr. 17, 2018 (KR) .......................... 10-2017-0055246

(51) Int. Cl.
*B60N 2/90* (2018.01)
*B60N 2/28* (2006.01)
(Continued)

(52) U.S. Cl.
CPC .............. *B60N 2/995* (2018.02); *B60N 2/26* (2013.01); *B60N 2/28* (2013.01); *B60N 2/938* (2018.02); *B60N 3/06* (2013.01); *B60N 3/063* (2013.01)

(58) Field of Classification Search
None
See application file for complete search history.

(56) References Cited

U.S. PATENT DOCUMENTS 866,316 A * 9/1907 Watson .................... A47C 7/52
297/423.4
D342,405 S * 12/1993 Hazel ............................ D6/333
(Continued)

FOREIGN PATENT DOCUMENTS

KR        20-0333281       11/2003
KR        10-1399896        5/2014
(Continued)

*Primary Examiner* — David R Dunn
*Assistant Examiner* — Christopher E Veraa
(74) *Attorney, Agent, or Firm* — Maschoff Brennan

(57) ABSTRACT

Disclosed herein is a footrest assembly of a car seat apparatus for young children that is capable of maintaining alignment with the car seat apparatus regardless of the installation position of the car seat apparatus and stably supporting the short legs of users such as the young children by varying and fixing the height of the footrest. The footrest assembly includes a base portion interposed between a vehicle seat and a car seat body for a young child; sidewall portions respectively erected upward on both sides of the base portion; one or more pressing portions facing each other toward a center of a width of the base portion and installed on the sidewall portions to press or release side portions of the car seat body for a young child; and a footrest portion connected to a front end portion of the sidewall portion with a connection unit.

6 Claims, 6 Drawing Sheets

(51) Int. Cl.
*B60N 2/26* (2006.01)
*B60N 3/06* (2006.01)

(56) References Cited

U.S. PATENT DOCUMENTS

| | | | | |
|---|---|---|---|---|
| 6,508,513 | B1* | 1/2003 | Hall | A47C 7/546 297/398 |
| 9,078,525 | B2* | 7/2015 | O'Sullivan | A47C 7/383 |
| 2003/0034677 | A1* | 2/2003 | Marshall | B60N 2/28 297/182 |
| 2003/0205921 | A1* | 11/2003 | McConnell | B60N 2/28 297/256.16 |
| 2004/0070245 | A1* | 4/2004 | McMakin | A47C 16/025 297/250.1 |
| 2008/0258525 | A1* | 10/2008 | Mendenhall | B60N 2/28 297/250.1 |
| 2009/0224591 | A1* | 9/2009 | Langhorn | A47C 7/52 297/423.39 |
| 2009/0315379 | A1 | 12/2009 | Jacobs et al. | |
| 2015/0115685 | A1* | 4/2015 | Lee | A47C 7/52 297/423.26 |
| 2015/0137575 | A1* | 5/2015 | Millasseau | B60N 3/063 297/423.38 |
| 2015/0336487 | A1* | 11/2015 | Blackledge | B60N 2/26 297/250.1 |
| 2016/0095444 | A1* | 4/2016 | Gredinger | A47C 7/506 297/423.4 |
| 2016/0096456 | A1* | 4/2016 | Longenecker | B60N 2/28 297/423.4 |
| 2017/0043682 | A1* | 2/2017 | Yang | B60N 2/28 |
| 2018/0126877 | A1* | 5/2018 | Williams | B60N 2/2851 |

FOREIGN PATENT DOCUMENTS

KR 10-1664311 B1 10/2016
KR 20-0482088 12/2016

* cited by examiner

ASSEMBLED FOOTREST OF CAR SEAT APPARATUS FOR EARLY CHILD

TECHNICAL FIELD

The present invention relates to a footrest assembly of a car seat apparatus for a young child, and more particularly, to a footrest assembly of a car seat apparatus for a young child that is capable of maintaining alignment with the car seat apparatus regardless of the installation state of the car seat apparatus and facilitating adjustment of the height and angle of the footrest through a simple configuration thereof to comfortably support the feet of the young child.

BACKGROUND ART

The vehicle seats of a typical passenger vehicle are not suitable for young children as they are manufactured to fit adults.

Therefore, vehicles are equipped with a separate car seat apparatus for young children that fits young children, in order to ensure comfort of the young children while the vehicle is operated.

A typical car seat apparatus for young children includes a seat portion and a back portion. The position of the seat portion installed on a seat in the vehicle is definitely higher than that of the vehicle seat.

As a result, the feet of a young child sitting on the car seat apparatus for young children do not reach the floor but are hung in the air.

If the feet of the young child do not reach the floor, the weight of a portion of the legs that is hung in the air is concentrated on the thighs of the young child, which support the portion. As a result, the young children feel uncomfortable as the legs become numb.

In the related art, there have been developed various types of footrest assemblies of car seat apparatuses for young children including the invention of Patent Document 1.

For the conventional art including Patent Document 1, installation is mostly based on a base plate interposed between a vehicle seat and the car seat apparatus for young children.

Generally, the base plate according to the above-described prior art has a non-slip portion formed on the upper or lower surface thereof to correspond to the lower surface of the car seat apparatus for young children and the upper surface of the vehicle seat and to prevent slippage.

However, since the vehicle seat is a fixed structure of the vehicle body, and the car seat apparatus for young children is fixed by a means such as a seatbelt provided on the vehicle seat, the car seat apparatus can be moved forward with respect to the normal position of the vehicle seat or be misaligned with the front-rear direction of the vehicle when sudden physical force acts on the vehicle such as in the case of sudden stop, sudden turn or collision.

At this time, the footrest assembly may be misaligned with the car seat apparatus for young children, which may result in imbalance in posture of the young child as well as discomfort due to non-uniform support of the feet of the young child.

In addition, the footrest assembly of the conventional car seat apparatuses for young children does not have a means to put the footrest assembly in correct alignment with the car seat apparatuses for young children which come in various sizes. Therefore, in order to correct misalignment between the footrest assembly and the car seat apparatus for young children, an adjustment operation including an operation of lifting the car seat apparatus several times and an operation of aligning the car seat apparatus is required.

DISCLOSURE

Technical Problem

Therefore, the present invention has been made in view of the above problems, and it is one object of the present invention to provide a footrest assembly of a car seat apparatus for young children which can be kept in an integrally aligned state for various car seat apparatuses to stably support the feet of the young child while maintaining the balance in response to the posture of the young child even when the installation position of the car seat apparatus is displaced from a normal position by physical force abruptly applied by burst of speed, sudden turn or the like of the vehicle.

It is another object of the present invention to provide a footrest assembly of a car seat apparatus for young children which can allow fine adjustment of the height and angle of the footrest in response to growth of the young child and facilitate installation and separation of the elements including connection of the elements by simplifying the respective elements.

Technical Solution

In accordance with one aspect of the present invention, provided is a footrest assembly of a car seat apparatus for a young child, the footrest assembly including a base portion interposed between a vehicle seat and a car seat body for a young child; sidewall portions respectively erected upward on both sides of the base portion; one or more pressing portions facing each other toward a center of a width of the base portion and installed on the sidewall portions to press or release side portions of the car seat body for a young child; and a footrest portion connected to a front end portion of the sidewall portion with a connection unit.

In addition, the connection unit may include two or more links and hinge units consecutively connected between a front end portion of the sidewall portions and a rear end portion of the footrest portion.

In addition, the hinge units may connect the front end portion of the sidewall portions to one end of the links corresponding to the front end portion, one end portion of one of the links to the other end portion of the other of the links, or the footrest portion to the other end of the links corresponding to the footrest portion, wherein one of the connected portions may be rotated or fixed with respect to the other of the connected portions.

In addition, the pressing portion may be a block body interposed between the sidewall portions and sidewalls of the car seat apparatus for a young child facing the sidewall portions and fitted by physical force so as to widen a gap between the sidewall portions and the sidewalls of the car seat apparatus for a young child, or may be screwed to the sidewall portions and provided with one end arranged on an inner side of the sidewall portions so as to move forward or backward according to the screwing to press or release the side portions of the car seat apparatus for a young child facing the one end arranged on the inner side of the sidewall portions, and the other end protruding outward from the sidewall portions may be configured to have a handle for adjusting a position of the screwing with respect to the sidewall portions.

In addition, the link may be formed in a shape of a rod having a width, a thickness, and a length and comprises one or more insertion holes penetrated in a thickness direction and arranged at one end of the link at intervals with respect to a longitudinal center, and one or more fastening holes penetrated in a thickness direction and arranged at the other end of the link at intervals.

Additionally, the insertion hole may be provided, on an inner circumferential surface thereof, with a projection, a gear, or a gear groove formed at a center thereof, wherein a part of a periphery of the inner circumferential surface may be provided with two or more engagement grooves formed outward to have a depth, wherein an engagement member may be installed by being fitted into the engagement grooves from a center of the insertion hole and have one end protruding to the other side of the links, wherein the one end of the engagement member may be provided with an engagement step protruding outward of the insertion hole and configured to be spaced apart from a circumference of the other side of the insertion hole, wherein the fastening holes may have a diameter larger than or equal to a diameter of the insertion hole, wherein one side of the fastening holes may be provided with an annular step inserted between the engagement step and the circumference of the other side of the insertion hole when the engagement member is installed at one side of the fastening holes, wherein the hinge units may be inserted into the insertion hole through the other side of the fastening holes and be fixed to outer and inner circumferences of the fastening holes.

The hinge units may each include a fastening member coupled to the other side of the fastening holes; a button having one side fitted into an inner side of the projection, gear or gear groove and the other side facing the fastening member, wherein an outer circumferential surface of the button is provided with a groove, a gear groove or a gear to be fitted to the projection, the gear or the gear groove, and the other-side outer circumferential surface of the button is provided with a stopper engaged with the projection, the gear or the other end of the engagement member; a guide member provided on one surface of the fastening member to prevent rotation of the button and guide movement of the button away from or close to the fastening member; and an elastic member interposed between the fastening member and the button to provide elastic force to space the button apart from the fastening member, wherein, when the button approaches the fastening member, a groove or gear groove or gear formed on an outer circumferential surface of the button to correspond to the projection, gear or gear groove formed on the inner circumferential surface of the insertion hole may be released from engagement, and the fastening member may be spaced apart from the button by the elastic force of the elastic member, such that the groove or gear groove or gear formed on the outer circumferential surface of the button may be engaged with the projection, gear or gear groove formed on the inner circumferential surface of the insertion hole.

Advantageous Effects

According to the configuration of the present invention, a footrest assembly of a car seat apparatus for young children includes a base portion interposed between a vehicle seat and the car seat apparatus for young children, sidewall portions erected on both sides across a width of the base portion, and a pressing portion supported by the sidewall portion to press and fix the side portions of the car seat apparatus for young children. Thereby, the footrest portion configured to support the feet of the young child may be kept in an aligned state with respect to the car seat apparatus for young children and stably support the feet of the young child even if physical force is applied to the vehicle by sudden stop, sudden turn, collision, and the like. Moreover, a bad posture of the young child may be prevented.

In addition, since the footrest member is arranged at various heights and angles by a connection unit and a hinge unit, it is easy to cope with growth of the young child. Further, the simplified configuration may facilitate the manufacturing and reduce the cost.

BEST MODE

Figure 1:
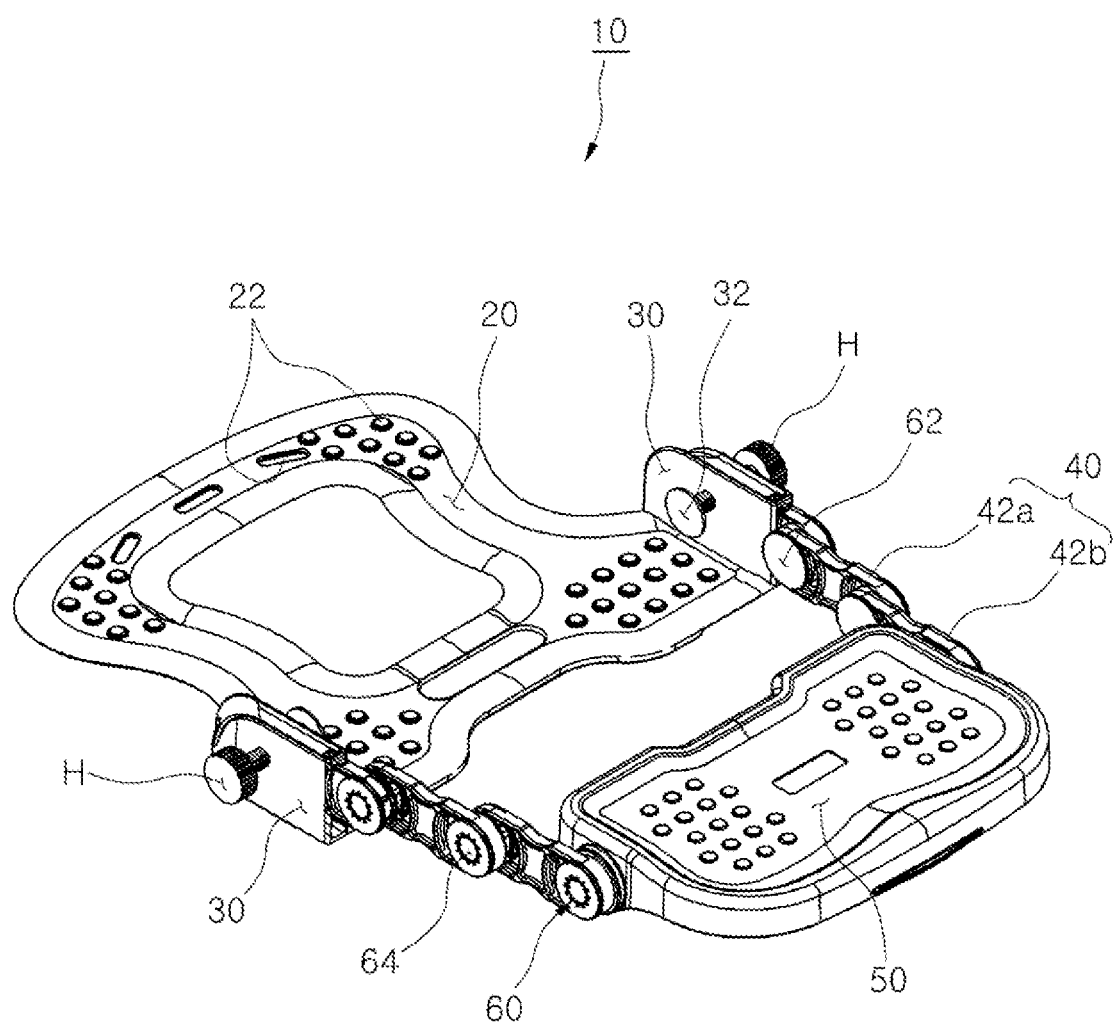
FIG. 1 is a perspective view schematically showing a footrest assembly of a car seat apparatus for young children according to an embodiment of the present invention.

The present invention provides, as a best mode, a footrest assembly of a car seat apparatus for a young child, including a base portion interposed between a vehicle seat and a car seat body for a young child; sidewall portions respectively erected upward on both sides of the base portion; one or more pressing portions facing each other toward a center of a width of the base portion and installed on the sidewall portion to press or release side portions of the car seat body for a young child; and a footrest portion connected to the connection unit from a front end portion of the sidewall portion.

MODE FOR INVENTION

The terms and words used in the specification and claims of the present invention are not to be construed as limited to ordinary or dictionary meanings, but should be interpreted as having meanings and concepts within the technical scope of the present invention, considering that the inventor can appropriately define the terms to describe the inventor's invention in the best way.

In addition, the embodiments described in the specification of the present invention and the configurations shown in the drawings are merely preferred embodiments of the present invention and do not represent the entire technical idea of the present invention. Therefore, it is to be understood that various equivalents and modifications that may replace the embodiments at the time of filing of the present invention are within the scope of the claims of the present invention.

In the description of the present invention, the expression "front" or "rear" refers to the forward or backward direction of the vehicle in which a car seat apparatus for young children is installed and portions arranged in this direction.

The lateral direction or width direction refers to the left-right width direction of the vehicle or portions in that direction.

Further, in the description of the present invention, the expression "one end" refers to one side of the longitudinal direction of an element having a length or a portion arranged on that side, and the expression "the other end" refers to the side of the longitudinal direction opposite to the one end or a portion arranged on that side.

Hereinafter, preferred embodiments of the present invention will be described in detail with reference to the accompanying drawings.

As shown in FIGS. 1 to 5, a footrest assembly 10, 10' of a car seat for young children according to the present invention includes a base portion 20, 20' interposed between a car seat (not shown) and a car seat apparatus A for young children, a sidewall portion 30, 30' erected upward on both sides of the base portion 20, 20', one or more pressing portions 32, 32' facing each other toward a center of a width of the base portion 20, 20' and installed on the sidewall portion 30, 30' to press or release side portions of the car seat apparatus A for young children, and a connection unit 40 provided at a front end portion of the sidewall portion 30, 30' and including two or more links 42a and 42b connected to each other to enable relative rotation and movement of the footrest portion 50, 50' with respect to the sidewall portion 30, 30'.

The connection unit 40 arranged on both sides includes a hinge unit 60 connected between the front end portion of the sidewall portion 30, 30' and a corresponding link 42a, 42b, between the links 42a, 42b, or between the footrest portion 50 and a corresponding link 42a, 42b, connected to enable or prevent rotation of one of the connected elements with respect to the other.

Embodiments of the present invention will be described respectively based on the configuration described above.

Embodiment 1

In the footrest assembly 10 for a car seat for young children according to Embodiment 1 of the present invention, the base portion 20 has a shape of a plate facing the lower surface of the car seat apparatus A for young children, and the width of the car seat apparatus 20 is at least greater than the width of the typical car seat apparatus A for young children.

In addition, the structure of the footrest assembly, the sidewall portion 30 erected upward is basically integrally formed on both sides in the width direction of the base portion 20.

Further, the above-mentioned base portion 20 may have prominences and depressions, such as projections or holes and grooves of various shapes, on the top surface thereof facing the lower surface of the car seat apparatus A for young children or the lower surface thereof facing the vehicle seat, or may have or be provided with a separate non-slip portion 22 such as a non-slip member having a high coefficient of friction.

The non-slip portion 22 provided on the upper surface and/or the lower surface of the base portion 20 is brought into close contact with the lower surface of the car seat apparatus A for young children or the upper surface of the vehicle seat (not shown) to increase frictional force. Thereby, the installation position of the car seat apparatus A for young children is prevented from being moved with respect to the vehicle seat when various physical forces are applied during travel of the vehicle.

The sidewall portion 30 may be formed integrally with the base portion 20 or may be fixed to the base portion 20.

Here, the sidewall portions 30 on both sides have a shape opposed to both side portions of the car seat apparatus A for young children.

That is, the lower portion of the car seat apparatus A for young children is arranged to be sandwiched between the sidewall portions 30 on both sides.

Figure 4:
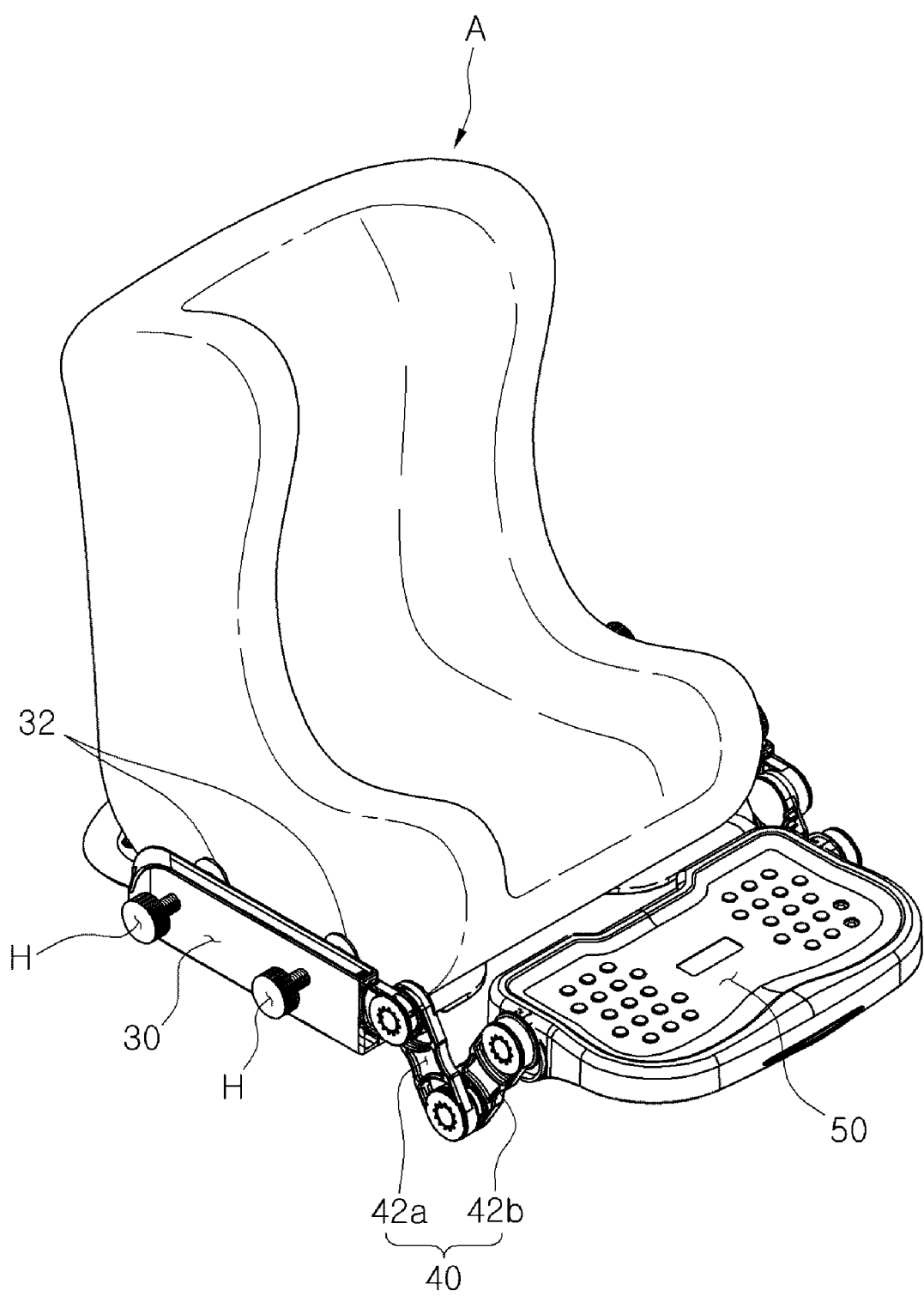
FIG. 4 is a perspective view schematically showing an installed state of a footrest assembly of a car seat apparatus for young children of the present invention.
Figure 5:
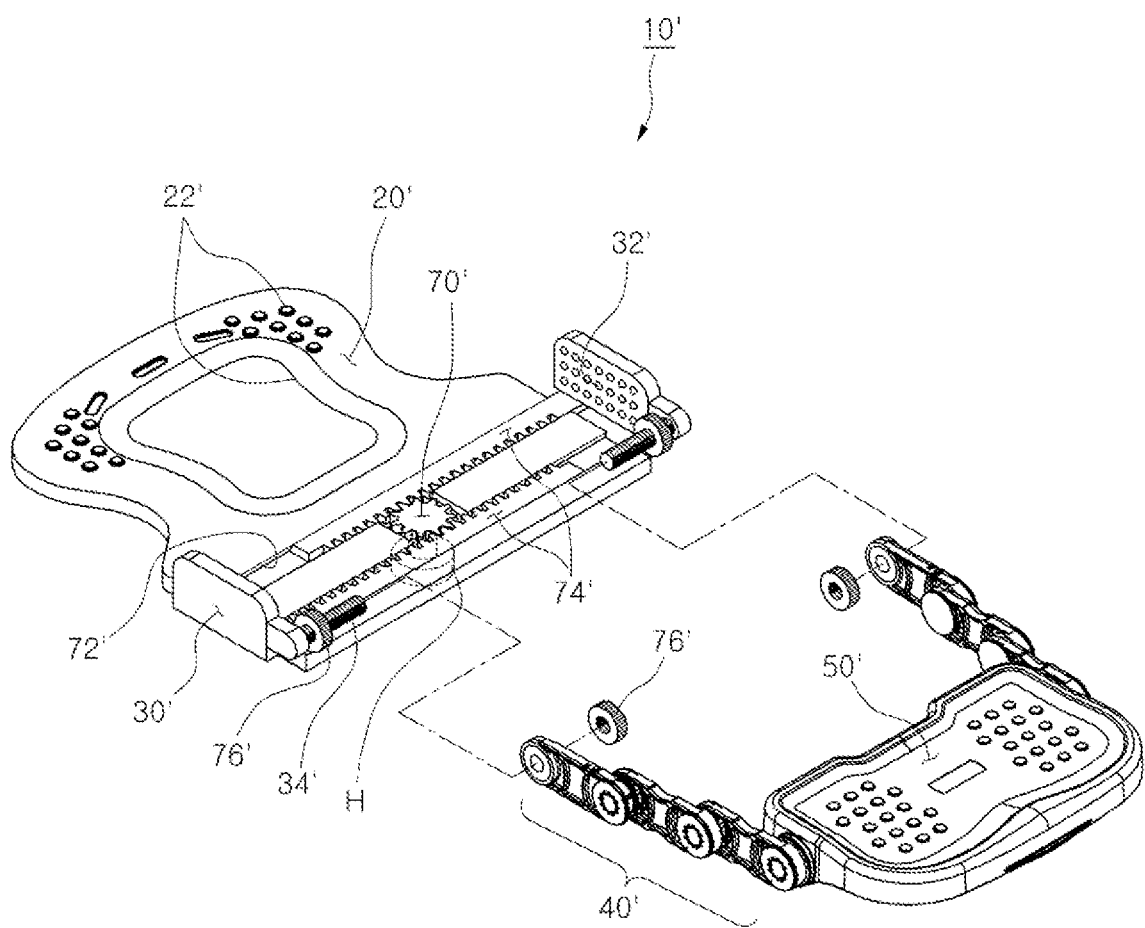
FIG. 5 is a perspective view schematically showing a footrest assembly of a car seat apparatus for young children according to another embodiment of the present invention.

Therefore, the sidewall portions 30 on both sides may be spaced apart from each other by a distance longer than or equal to the width of the car seat apparatus A for young children. The sidewall portions 30 may be formed only on both sides corresponding to the front portion of the base portion 20 in the front-back direction as shown in FIG. 1, or be formed to be long enough to correspond to the length of the side portions of the car seat apparatus A for young children as shown in FIG. 4, such that the installation position of at least a portion of the length of the side portions of the car seat apparatus A for young children connected to the connection unit 40 is stably maintained. Although not shown in the drawings, a plurality of sidewall portions may be formed in a front-back longitudinal direction.

The pressing portion 32 described above is interposed between the sidewall portion 30 and a side portion of the car seat apparatus A for young children facing the sidewall portion so as to press the car seat apparatus A with respect to the sidewall portion 30. The pressing portion fixes the footrest assembly 10 including the sidewall portion 30 and the base portion 20 such that the footrest assembly is integrated with the car seat apparatus A for young children.

The pressing portion 32 may be fabricated in various forms. For example, the pressing portion 32 may be a block body that is fitted by physical force so as to widen the gap between the sidewall portion 30 and the sidewall of the car seat apparatus A for young children or may be a screw body arranged through the sidewall portion 30 and including one end arranged on the inner side the sidewall portion 30 so as to move to press or release side portions of the car seat apparatus A for young children facing the one end and the other end protruding outward from the sidewall portion 30 and configured to have a handle (H) for adjusting the position of the screwing with respect to the sidewall portion 30.

In the connection unit 40 formed by connecting the at least two links 42a, 42b described above, one end or one end portion of one link 42a is connected to the corresponding front portion or front end portion of the sidewalls 30. Thereby, the other end of the link is pivotably arranged.

In addition, one end or one end portion of the other link 42b is consecutively connected to the one link, and the other end thereof is arranged pivotable about the one end or one end portion.

The connection and angle of connection between the two or more links 42a, 42b may finely form the height at which the footrest 50 is placed with respect to the sidewall portions 30 connected to each other, the spacing between the car seat apparatus A for young children and the footrest 50, and the angle at which the footrest 50 is placed, as desired.

Here, connection between the links 42a, 42b is established based on the spacing between the sidewall portions 30. Although not shown in the drawings, support members 34' (see FIG. 5) may extend from the front or front end portions of the sidewall portions 30 on both sides in a direction in which the sidewall portions 30 face each other, and the connection unit 40 may be connected to the support members.

In this case, the support members 34' described above may be supported by the front portion of the car seat apparatus A for young children, and restrict the installation positions of the car seat apparatus A for young children and the footrest assembly 10.

In addition, while the links 42a, 42b constituting the connection unit 40 are illustrated as being connected so as to overlap each other in the width direction, embodiments are not limited thereto. Although not shown in the drawings, one end of one of the parts of the links 42a, 42b connected to each other may have a protruding central portion in the thickness direction and both sides of the other end of the other link 42b 42a in the thickness direction may be formed to have a protruding shape to allow the protruding portion of the one end to be fitted therebetween.

Additionally, in implementing the connection unit 40 described above, each of the links 42a, 42b may be formed in the shape of a rod having a width, a thickness, and a length and include both end portions, one or more insertion holes penetrated therein in the thickness direction and arranged at intervals in the longitudinal direction, and one or more fastening holes 46.

The insertion holes 44 may be disposed at one side of the longitudinal center of each of the links 42a, 42b and the fastening holes 46 may be disposed at the other side of the longitudinal center of each of the links 42a, 42b.

In other words, in constructing each of the links 42a, 42b, the insertion holes 44 may be formed on one side of the longitudinal center of the link and the fastening holes 46 may be formed on the other side, such that the insertion holes 44 and the fastening holes 46 are arranged to correspond to each other when the links 42a, 42b are connected to each other.

In addition, the fastening holes 46 and the insertion hole 44 are disposed at the front end or front portion of the sidewall portion 30 corresponding to one end of the links 42a, 42b or one end of the footrest portion 50 corresponding to the other end of the links 42a, 42b so as to correspond to each other.

Forming the insertion holes 44 and the fastening holes 46 separately on one side and the other side allows installation of the hinge unit 60 according to the present invention.

Figure 2:
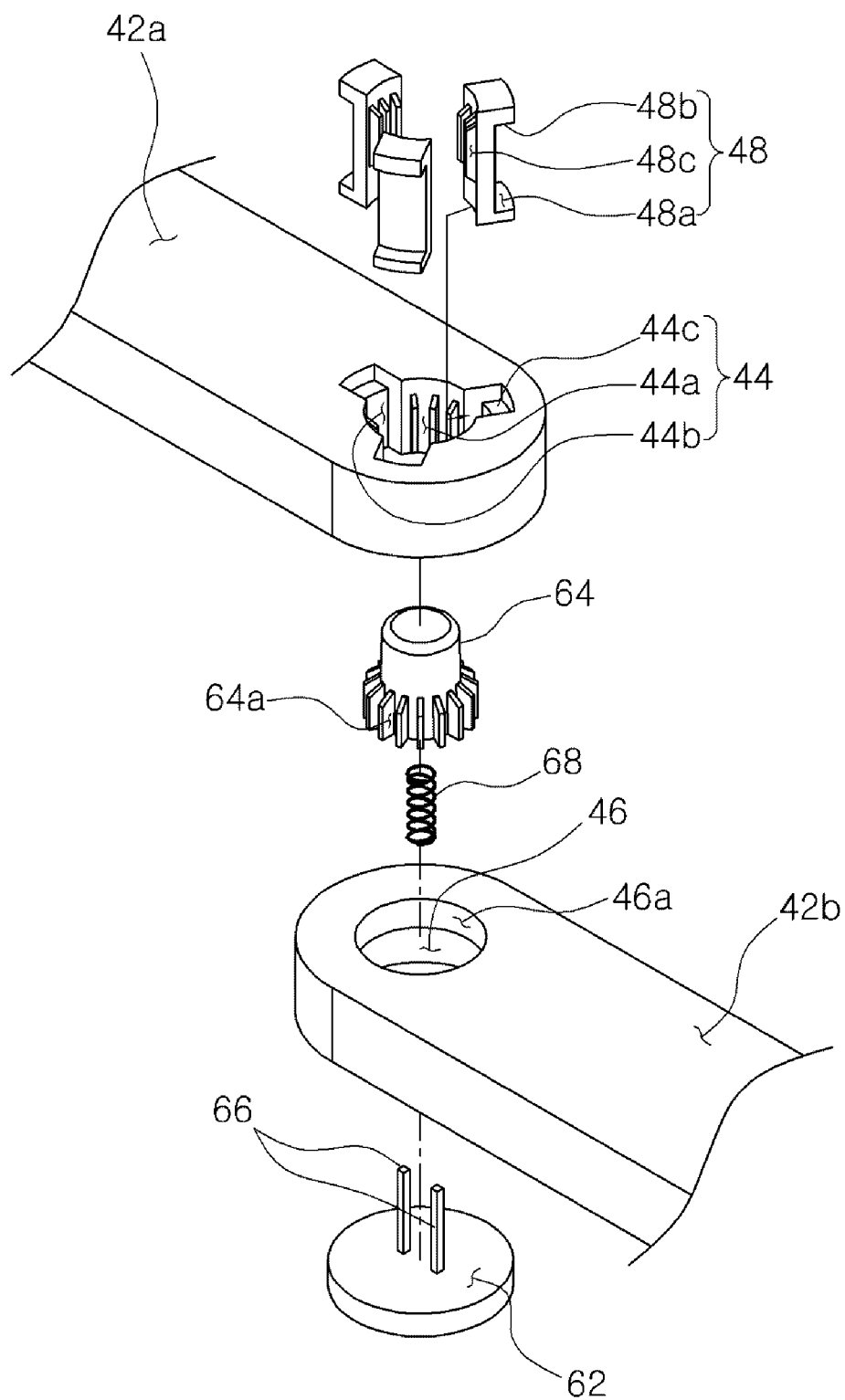
FIG. 2 is a partial exploded perspective view schematically illustrating a coupling relationship between the link and the hinge unit of FIG. 1.
Figure 3A:
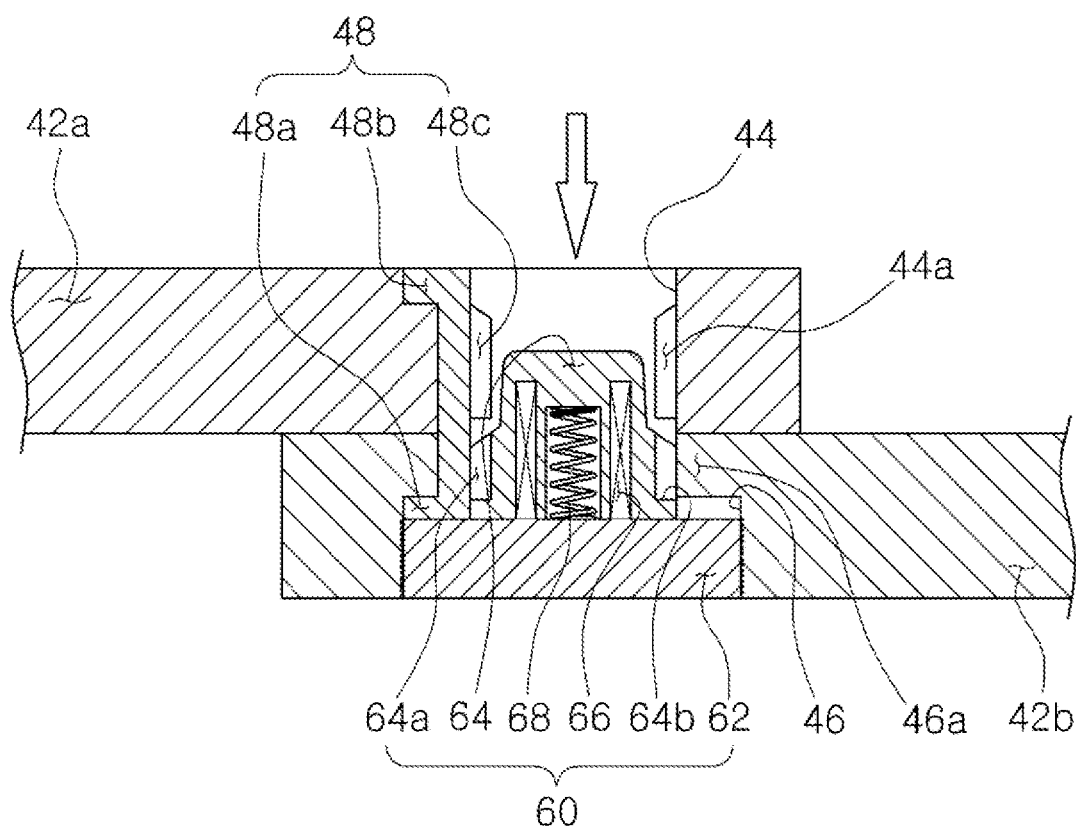
FIG. 3 is a cross-sectional view schematically illustrating engagement and disengagement of the hinge unit, taken along line III-III in FIG. 2.
Figure 3B:
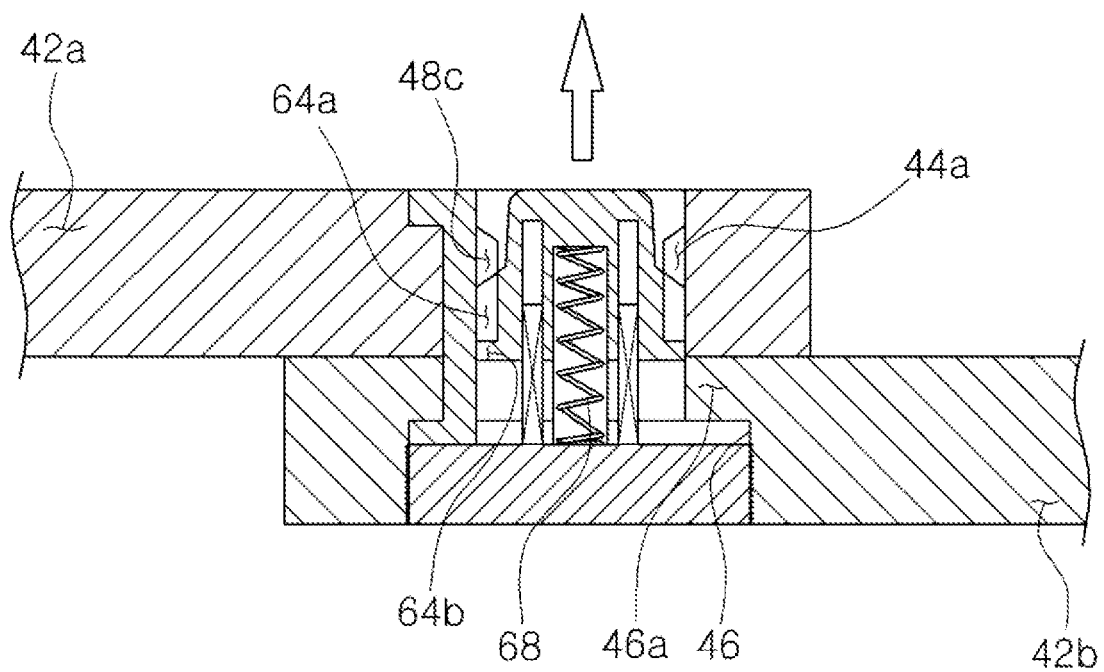

The relationship between the hinge unit 60 and the insertion hole 44 and fastening hole 46 for installation thereof will be described with reference to FIGS. 2 to 3B.

First, the insertion hole 44 is provided, on the inner circumferential surface thereof, with a projection, a gear or a gear groove 44a protruding toward the center thereof, and a part of the circumference of the inner circumferential surface is provided with one or more engagement grooves 44b depressed outward away from the center of the insertion hole 44 so as to have a certain depth.

Engagement members 48 are installed in each engagement groove 44b of the insertion hole 44. The engagement members 48 are each fitted into the engagement grooves in an outward direction from the center of the insertion hole 44 and the inner surfaces thereof facing inward form circular surfaces concentric with the inner circumferential surface of the insertion hole 44. One end of each engagement member 48 protrudes to one side in the hole formation direction of the insertion hole 44 by a distance longer than or equal to the thickness of the link 42a or 42b and forms an engagement step 48a spaced apart from the circumference of the insertion hole 44.

In other words, the outer portions of the engagement members 48 are fitted into the corresponding engagement grooves 44b formed in the inner circumferential surface of the insertion hole 44 at the center position of the insertion hole 44, and accordingly rotation thereof in the circumferential direction of the insertion hole 44 is prevented. In addition, the engagement steps 48a arranged on one side and spaced apart from the circumference of the insertion hole 44 rotatably support an annular step 46a of the fastening hole 46, which will be described later.

In addition, the inner surface of the engagement member of 48, namely the surface facing the center of the insertion hole 44, may be provided with a projection, a gear or a gear groove 48c having the same shape as the projection, gear or gear groove 44a formed on the inner circumferential surface of the insertion hole 44. The projections, gears or gear grooves 44a, 48c are arranged along the circumference of the insertion hole 44 in the same pitch relationship.

A part of the other side of the above-described engagement groove 44b has an expanded groove 44c formed to the outer side of the insertion hole 44 to have a greater depth, and the other end of the engagement member 48 corresponding thereto is provided with an engagement step 48b protruding outward from the center of the insertion hole 44. Thus, as the engagement between the engagement groove and the engagement step and the coupling between the annular steps 46a of the fastening hole 46 including the engagement configuration, and the hinge unit 60, which will be described later, prevent movement of the engagement member toward the center of the insertion hole 44, thereby stably maintaining engagement.

The above-described fastening hole 46 is penetrated from one side to the other to have a diameter larger than or equal to that of the insertion hole 44 and is provided with the annular step 46a having a thickness in the thickness direction from one side to the other side of the fastening hole 46 corresponding to the thickness formed by the circumference of the insertion hole 44 on the other side and the engagement steps 48a and 48b such that the engagement steps 48a and 48b move outward from the center of the fastening hole 46 to be hung on the annular step 46a.

The hinge unit 60, which is installed in a manner that at least a part thereof is fitted into the fastening hole 46 through the other side of the fastening hole, is provided with a fastening member 62 which is coupled to the other side of the fastening hole 46.

In addition, the hinge unit 60 includes a button 64 having one side fitted onto the inner side of the projection, gear or gear groove 44a, 48c formed on the inner surface of the insertion hole 44 or the engagement member 48 and the other side arranged spaced apart from one surface of the fastening member 62. The button 64 includes a groove, gear groove, or gear 64a formed on the outer circumferential surface thereof fitted to the corresponding projection, gear or gear groove 44a, 48c formed on the inner surface of the engagement member 48 at a rotation position, and a stopper 64b protruding outward from the outer circumferential surface thereof on the other side to be placed on the projection, gear or gear groove 44a, 48c formed on the inner surface of the insertion hole 44 or the engagement member 48 or the other end of the engagement member 48.

The hinge unit 60 includes a guide member 66 provided on one surface of the fastening member 62 to prevent rotation of the button 64 and guide the button 64 away from or close to the fastening member 62, and an elastic member 68 interposed between the fastening member 62 and the button to provide elastic force to space the button 64 apart from the fastening member 62.

According to the hinge unit 60 configured as above, when the button 64 is pushed to approach the fastening member 62 against the elastic force of the elastic member 68, the groove or gear groove or gear 64a formed on the outer circumferential surface of the button 64 to correspond to the projections, gears or gear grooves 48c formed on the inner circumferential surface of the insertion hole 44 or the inner surface of the engagement member 48 is released from engagement for rotation about the center of the hinge unit 60. Thereby, both links 42a, 42b are rotatably supported by the engagement step 48a of the engagement member 48 within a range within which separation thereof is prevented. Thus, one of the links is allowed to rotate about the center of the hinge unit 60 with respect to the other link.

When the user eliminates the pressing force applied to the button 64, the button 64 is moved away from the fastening member 62 by the elastic force of the elastic member 68, and the groove, gear groove or gear 64a formed on the outer circumferential surface of the button 64 is fitted to the corresponding projection, gear or gear groove 44a, 48c formed on the inner circumferential surface of the insertion hole 44 or the inner surface of the engagement member 48, such that the stopper 64b formed on the other side of the button 64 is engaged with the projection, gear or gear groove 44a, 48c formed on the inner circumferential surface of the insertion hole 44 or the inner surface of the engagement member 48, thereby preventing rotation. The other link 42a, 42b engaged with the fastening member 62 is prevented from rotating due to the support relationship between the button 64 and the guide member 66.

Although the above-described guide member 66 is shown as having the shape of a column erected from one-side surface of the fastening member 62, embodiments are not limited thereto. The guide member 66 may be formed to have a polygonal shape, an elliptical boss shape or the like so as to be correspondingly fitted into the inner side of the button 64 to rotate together with the button 64.

Embodiment 2

In the configuration of a footrest assembly 10' of a car seat apparatus for young children of another embodiment of the present invention for achieving the object of the present invention, the sidewall portions 30' on both sides are supported by a base portion 20' and allowed to move to widen or narrow the gap therebetween, and the base portion 20' further includes a position fixture 70' configured to fix the position to which both sidewall portions 30' are moved.

Specifically, the base portion 20' may be provided with a guide groove 72' formed widthwise on the upper surface or the lower surface thereof. In addition, an extension 74' extending widthwise in a curved shape and guided by the guide groove 72' may be formed at the lower portions of the sidewall portions 30' on both sides.

In addition, the position fixture 70' described above may be structured to be supported by the base portion 20' so as to vertically press an intersection portion of the extensions 74' on both sides.

In an embodiment of the position fixture 70', when both extensions 74' are arranged back and forth so as to intersect with each other with the position fixture 70' placed therebetween, and the surfaces of the extensions 74' facing each other are provided with teeth, the position fixture 70' placed between the extensions may operate as a pinion for the extensions 74'.

When the position fixture 74' is formed to have a pinion structure as described above, rotation thereof is prevented by pressure and friction between the position fixture and the lower surface of the upper car seat apparatus A for young children on the upper side or the vehicle seat on the lower side. Alternatively, an optional pawl (not shown) may be provided for the teeth on the circumference of the position fixture 70'.

The connection unit 40' for connecting the sidewall portions 30' and the footrest portion 50' is the same as that of Embodiment 1. In connecting the connection unit 40' to the sidewall portions 30' having an adjustable widthwise gap therebetween, the support members 34' extending to face each other may be formed at the front end portions of both sidewall portions 30'. With an end of the support members 34' fitted into the insertion hole 44 or the fastening hole 46 of the links 42a, 42b, the positions of the links 42a, 42b may be fixed by the fixture 76' configured to slidably move along the support members 34' and to fix the moved position.

The invention claimed is:

1. A footrest assembly of a car seat apparatus for a young child, the footrest assembly comprising:
a base portion interposed between a vehicle seat and a car seat body for a young child;
sidewall portions respectively erected upward on both sides of the base portion;
pressing portions installed on the sidewall portions to press or release side portions of the car seat body for a young child facing each other toward a center of a width of the base portion; and
a footrest portion connected to a front end portion of the sidewall portion with a connection unit,
wherein the sidewall portions on the both sides are supported by the base portion and allowed to move in a direction to widen or narrow a gap therebetween, and
wherein the base portion further comprises a position fixture configured to fix a position to which the sidewall portions are moved.

2. The footrest assembly according to claim 1, wherein the pressing portion is screwed to the sidewall portions and provided with one end arranged on an inner side of the sidewall portions so as to move forward or backward according to the screwing to press or release the side portions of the car seat apparatus for a young child facing the one end arranged on the inner side of the sidewall portions, and the other end protruding outward from the sidewall portions is configured to have a handle for adjusting a position of the screwing with respect to the sidewall portions.

3. The footrest assembly according to claim 1, wherein the connection unit comprises two or more links and hinge units consecutively connected between a front end portion of the sidewall portions and a rear end portion of the footrest portion.

4. The footrest assembly according to claim 3, wherein the hinge units connect the front end portion of the sidewall portions to one end of the links corresponding to the front end portion, one end portion of one of the links to the other end portion of the other of the links, and the footrest portion to the other end of the links corresponding to the footrest portion.

5. The footrest assembly according to claim 4, wherein the insertion hole is provided, on an inner circumferential surface thereof, with a projection, a gear, or a gear groove formed at a center thereof,
wherein a part of a periphery of the inner circumferential surface is provided with two or more engagement grooves formed outward to have a depth, wherein an engagement member is installed by being fitted into the engagement grooves from a center of the insertion hole, and has one end protruding to the other side of the links, wherein the one end of the engagement member is provided with an engagement step protruding outward of the insertion hole and configured to be spaced apart from a circumference of the other side of the insertion hole, wherein the fastening holes have a diameter larger than or equal to a diameter of the insertion hole, wherein one side of the fastening holes is provided with an annular step inserted between the engagement step and the circumference of the other side of the insertion hole when the engagement member is installed at one side of the fastening holes, wherein the hinge units are inserted into the insertion hole through the other side of the fastening holes and is fixed to outer and inner circumferences of the fastening holes.

6. The footrest assembly according to claim 5, wherein the hinge units each comprise:

a fastening member coupled to the other side of the fastening holes;

a button having one side fitted into an inner side of the projection, gear or gear groove and the other side facing the fastening member, wherein an outer circumferential surface of the button is provided with a groove, a gear groove or a gear to be fitted to the projection, the gear or the gear groove, and the other-side outer circumferential surface of the button is provided with a stopper engaged with the projection, the gear or the other end of the engagement member;

a guide member provided on one surface of the fastening member to prevent rotation of the button and guide movement of the button away from or close to the fastening member; and an elastic member interposed between the fastening member and the button to provide elastic force to space the button apart from the fastening member, wherein, when the button approaches the fastening member, a groove or gear groove or gear formed on an outer circumferential surface of the button to correspond to the projection, gear or gear groove formed on the inner circumferential surface of the insertion hole is released from engagement, and the fastening member is spaced apart from the button by the elastic force of the elastic member, such that the groove or gear groove or gear formed on the outer circumferential surface of the button is engaged with the projection, gear or gear groove formed on the inner circumferential surface of the insertion hole.

* * * * *